United States Patent
Ariyama et al.

(10) Patent No.: US 12,472,573 B2
(45) Date of Patent: Nov. 18, 2025

(54) SCREEN TO BE USED DURING BRAZING OF HEAT EXCHANGER AND BRAZING METHOD FOR HEAT EXCHANGER

(71) Applicants: Mahle International GmbH, Stuttgart (DE); Mahle Filter Systems Japan Corporation, Tokyo (JP)

(72) Inventors: Masahiro Ariyama, Tokyo (JP); Yohei Hatano, Tokyo (JP); Hiroshi Kumagai, Tokyo (JP)

(73) Assignees: MAHLE INTERNATIONAL GMBH (DE); MAHLE FILTER SYSTEMS JAPAN CORPORATION (JP)

( * ) Notice: Subject to any disclaimer, the term of this patent is extended or adjusted under 35 U.S.C. 154(b) by 304 days.

(21) Appl. No.: 17/798,066

(22) PCT Filed: Jan. 25, 2021

(86) PCT No.: PCT/EP2021/051559
§ 371 (c)(1),
(2) Date: Aug. 5, 2022

(87) PCT Pub. No.: WO2021/156084
PCT Pub. Date: Aug. 12, 2021

(65) Prior Publication Data
US 2023/0089422 A1 Mar. 23, 2023

(30) Foreign Application Priority Data
Feb. 7, 2020 (JP) .................................. 2020-19365

(51) Int. Cl.
*B23K 1/00* (2006.01)
*B23K 3/08* (2006.01)
*F28D 9/00* (2006.01)

(52) U.S. Cl.
CPC ............ *B23K 1/0012* (2013.01); *B23K 3/087* (2013.01); *F28D 9/005* (2013.01); *F28F 2275/04* (2013.01)

(58) Field of Classification Search
CPC ....... B23K 1/0012; B23K 3/087; F28D 9/005; F28D 1/03; F28F 2275/04; F28F 1/045
See application file for complete search history.

(56) References Cited

U.S. PATENT DOCUMENTS

| 2,817,895 A | 12/1957 | Chill |
| 3,378,914 A | 4/1968 | Miller |

(Continued)

FOREIGN PATENT DOCUMENTS

| CN | 104854419 A | 8/2015 |
| CN | 105473974 A | 4/2016 |

(Continued)

OTHER PUBLICATIONS

Chinese Search Report dated Jun. 29, 2023 for CN202180012705.3 (w_translation).

(Continued)

*Primary Examiner* — Nelson J Nieves
(74) *Attorney, Agent, or Firm* — Fishman Stewart PLLC

(57) ABSTRACT

A screen for brazing a heat exchanger including a plurality of core plates and a base plate. The plurality of core plates may be formed from an aluminum alloy brazing sheet containing magnesium and may have a shape having a taper portion at a periphery. The base plate may be larger and thicker than a core plate of the plurality of core plates. The plurality of core plates and the base plate may be heated and brazed under an inert gas atmosphere. The screen may include a metal tube enclosing a stacked body of the plurality of core plates. The tube may follow the outer border of the plurality of core plates such that a specific minute gap (Continued)

is defined between an inner wall face of the tube and a tip edge of the taper portion.

20 Claims, 12 Drawing Sheets

(56) References Cited

U.S. PATENT DOCUMENTS

| | | | | |
|---|---|---|---|---|
| 3,941,293 | A * | 3/1976 | Chartet | B23K 1/008 228/183 |
| 4,701,127 | A | 10/1987 | Dockus | |
| 5,340,015 | A | 8/1994 | Hira | |
| 6,031,751 | A | 2/2000 | Janko | |
| 6,161,615 | A * | 12/2000 | Brieden | F28F 9/002 165/47 |
| 6,394,179 | B1 * | 5/2002 | Blomgren | F28D 9/005 165/DIG. 372 |
| 6,904,961 | B2 * | 6/2005 | Ayres | F28F 21/082 228/183 |
| 8,707,747 | B1 | 4/2014 | Norris | |
| 2002/0066552 | A1 * | 6/2002 | Komoda | F28F 19/004 165/134.1 |
| 2007/0006998 | A1 * | 1/2007 | Brost | F28F 3/044 165/167 |
| 2009/0025914 | A1 * | 1/2009 | Knight | F28D 1/05391 165/174 |
| 2013/0228307 | A1 * | 9/2013 | Kanzaka | F28F 3/08 165/76 |
| 2015/0053751 | A1 | 2/2015 | Eckhard | |
| 2016/0199953 | A1 | 7/2016 | Wakamatsu | |
| 2016/0214215 | A1 | 7/2016 | Wakamatsu | |
| 2016/0250703 | A1 | 9/2016 | Bornegard | |
| 2017/0151638 | A1 | 6/2017 | Itoh | |
| 2018/0093355 | A1 | 4/2018 | Sato | |
| 2019/0151973 | A1 | 5/2019 | Itoh | |
| 2021/0031289 | A1 | 2/2021 | Yanagawa | |
| 2021/0394313 | A1 | 12/2021 | Yamayoshi | |
| 2022/0011052 | A1 * | 1/2022 | Marie | F28F 3/08 |
| 2023/0089422 | A1 | 3/2023 | Ariyama | |

FOREIGN PATENT DOCUMENTS

| | | |
|---|---|---|
| CN | 105705284 A | 6/2016 |
| EP | 2803442 A1 | 11/2014 |
| EP | 2848354 A1 | 3/2015 |
| EP | 3459676 A1 | 3/2019 |
| JP | H0985433 A | 3/1997 |
| JP | 2006035232 A | 2/2006 |
| JP | 2006043735 A | 2/2006 |
| JP | 2006175500 A | 7/2006 |
| JP | 2014237142 A | 12/2014 |
| JP | 2016203193 A | 12/2016 |
| JP | 2017074609 A | 4/2017 |
| WO | 2019035316 A1 | 2/2019 |
| WO | 2019115422 A1 | 6/2019 |
| WO | 2019151315 A1 | 8/2019 |

OTHER PUBLICATIONS

Chinese Office Action dated Jun. 30, 2023 for CN202180012705.3 (w_translation).
English abstract for JP-H0985433.
English abstract for JP-2006175500.
English abstract for JP-2006035232.
English abstract for JP-2006043735.

* cited by examiner

SCREEN TO BE USED DURING BRAZING OF HEAT EXCHANGER AND BRAZING METHOD FOR HEAT EXCHANGER

CROSS-REFERENCE TO RELATED APPLICATIONS

This application claims priority to International Patent Application No. PCT/EP2021/051559, filed on Jan. 25, 2021, and Japanese Patent Application No. JP 2020-19365, filed on Feb. 7, 2020, the contents of both of which are hereby incorporated by reference in their entirety.

TECHNICAL FIELD

The present invention relates to art for manufacturing a heat exchanger assembled by brazing using a brazing sheet composed of an aluminum alloy cladded material, and in particular, relates to a screen used while brazing and to a brazing method using the same.

BACKGROUND

For example, a heat exchanger used as an oil cooler or the like in a vehicle is generally constituted from an aluminum alloy in consideration of thermal conductivity, specific weight, formability, and the like, and many methods are employed wherein a brazing sheet composed of a cladded material having a brazing material layer having a relatively low melting point provided on the surface is used to form a plurality of members, and once these members are temporarily assembled they are heated in a furnace and integrally brazed.

Brazing construction methods largely are broadly categorized as so-called CAB methods (Control Atmosphere Brazing) performed under atmospheric pressure using an inert gas (nitrogen, argon, or the like) and utilizing a fluoride based flux, and so-called VB methods (Vacuum Brazing Method) performed under high vacuum and not utilizing flux.

In CAB methods, a workpiece to be brazed is coated in advance with a non-corrosive fluoride based flux, whereby an oxide film on the surface of the brazing material layer of the brazing sheet can be broken down during brazing. Accordingly, a melted brazing material spreads into an interstice between members due to surface tension and a bond between the members is formed.

In VB methods, an aluminum alloy containing Mg is used as the brazing material layer or core material of the cladded material, or otherwise Mg is placed inside a furnace separate from the workpiece, and brazing is performed under a high vacuum. Heating the Mg in the furnace breaks down the oxide film on the surface of the brazing material layer of the brazing sheet, and the evaporated Mg captures traces of oxygen and moisture which are brazing inhibitory substances which exist near the surface. Accordingly, brazing that does not utilize flux is possible.

CAB methods performed under atmospheric pressure have comparatively short formation cycle times and comparatively inexpensive equipment costs, but there are many drawbacks associated with using flux such as requiring a flux coating process, a flex residue cleaning process, or the like.

On the other hand, VB methods do not have problems relating to flux, but mass-productivity is low due to batch processing using vacuum furnaces, and the equipment can easily become very costly.

In light of this, JP 2006-175500A and JP H9-85433A propose covering the workpiece using a metal cover-shaped member to enable brazing of an aluminum alloy brazing sheet without using flux and without needing a high vacuum.

JP 2006-175500A teaches a configuration wherein a workpiece is configured using an aluminum alloy brazing sheet containing Mg, and the workpiece is warmed to near the melting point of the brazing material inside a furnace, at which point the workpiece is covered by a cover-shaped windscreen jig. The windscreen jig is configured so as to be used in circulation inside the furnace.

Furthermore, JP H9-85433A discloses using an aluminum alloy brazing sheet containing Mg or using a separate Mg supply source to overlay the cover-shaped cover onto the workpiece before heating. The cover has a box-shaped configuration wherein a hole is opened in the center of the ceiling face.

However, the configuration in JP 2006-175500A requires a mechanism or device for raising and lowering the windscreen jig inside the furnace to overlay the workpiece, and the furnace becomes complex and costly.

Furthermore, JP H9-85433A has a configuration wherein the cover is placed over a support stand for the workpiece provided inside the furnace; as such, the strict management of gaps between the cover and the workpiece is difficult and the operation process for attaching and detaching the cover inside the furnace is troublesome.

However, when overlaying a box-shaped cover as in JP H9-85433A, the radiant heat of the furnace has no effect on the workpiece, and therefore, while the brazing itself is inhibited, the Mg is widely diffused within the cover, and in reality brazing without using flux ultimately cannot be realized.

SUMMARY

The present invention is to provide a screen to be used when brazing a heat exchanger having a plurality of core plates formed from an aluminum alloy brazing sheet containing Mg and formed in a shape having a taper portion at the periphery which are stacked such that the taper portions touch together and are heated and brazed under an inert gas atmosphere together with a base plate on the lower face side which is larger and thicker than the core plates.

The screen is formed from a metal sheet as a tube enclosing a stacked body of the core plates, follows the outer border of the core plates such that the inner wall face of the tube has a specific minute gap between it and the tip edge of the taper portion, and is mounted onto the base plate.

When brazing, the Mg contained in the brazing sheet breaks down the aluminum oxide film on the brazing sheet surface which causes brazing to be difficult. Furthermore, due to the stacked body of core plates, which is the workpiece, being enclosed by the screen of the present invention, Mg that is vaporized from the brazing sheet as it is heated does not disperse into the atmosphere but remains near the perimeter of the core plates, and this Mg captures oxygen and moisture which hinder brazing properties. Therefore, it is possible to braze a heat exchanger without using flux and without a vacuum furnace. Specifically, the brazing properties are improved for taper portions on the periphery which are in a form such that they are exposed to the atmosphere during brazing.

Here, in the present invention, the stacked body of core plates that form a primary part of the heat exchanger are stacked onto a base plate that is larger and thicker than the core plates, and the screen is set so as to enclose the stacked body of core plates and is mounted onto the base plate. In other words, the screen is supported by the base plate, which is a portion of the workpiece sent into and out of the furnace, and the screen is conveyed having become integrated with the workpiece. Accordingly, it is easy to manage the minute gap between the core plates and the screen, and the screen becomes easy to handle, including sending into and out of the furnace.

In one preferable aspect of the present invention, an engaging portion of the base plate and the bottom end of the screen engage to locate the screen.

Preferably, the screen is located using locating pins provided on the base plate in order to locate the stacked body of core plates on the base plate.

When the screen is located using locating pins in this manner, the gap between the stacked body of core plates and the inner wall face of the screen can be more precise. Furthermore, using the locating pins for both locating the stacked body of core plates and locating the screen reduces the number of components.

In another aspect of the present invention, a second base plate smaller than the first base plate is superimposed on the base plate, and the screen is located using the periphery of the second base plate. In other words, a relatively small second base plate is superimposed on the base plate to produce a step, and the screen is located using this step.

Preferably, the minute gap is at least 0.5 mm and no more than 5 mm.

The Mg contained in the brazing sheet is generally a minute amount, and therefore, if the gap between the stacked body of core plates and the screen inner wall face is large, the vaporized Mg will diffuse into the atmosphere and will not sufficiently capture oxygen and moisture near the brazing location. Therefore, it is desirable for the gap to be no more than 5 mm.

In a preferable aspect of the present invention, a brim portion covering the upper end of the minute gap is provided on the upper end of the tube portion enclosing the stacked body of core plates. Due to this brim portion, diffusion of vaporized Mg in the upward direction is effectively restricted.

In a preferable aspect of the present invention, the screen is configured separated into a plurality of pieces so as to enclose, from the perimeter, the stacked body of core plates assembled on the base plate. In one example, the screen is configured separated in two into a first half portion and a second half portion so as to sandwich, from both sides, the stacked body of core plates assembled on the base plate. For example, in a heat exchanger having a format such as a metal pipe leading out from the upper portion of the stacked body formed by stacking the core plates, there are times when a tube shaped screen cannot be overlaid as is onto the stacked body of core plates. Even in such a situation, configuring the screen to be separated enables the screen to be disposed in a state near the taper portions.

In a configuration separated into two such as this, preferably, at the boundary between the first half portion and the second half portion, the edge portion of one extends, being offset to the outside only by the plate thickness, and overlaps together with the other edge portion located on the inside. Accordingly, the inner wall face of the tube is substantially continuous in the circumferential direction without any steps.

It is preferable for the screen to be formed from a metal material having a coefficient of thermal expansion of at least $11\times10^{-6}$ and a melting point of at least 650° C.

Using a metal material having a comparatively large coefficient of thermal expansion in this manner inhibits the reduction of the minute gap between the core plates and the screen during brazing, or in other words, when the temperature rises. In other words, contact with the screen due to thermal expansion of the core plates as the temperature rises can be inhibited. That is, the coefficient of thermal expansion of the aluminum alloy material forming the brazing sheet and the base plate is, for example, approximately $23\times10^{-6}$, and it is preferable to have a small difference between the coefficient of thermal expansion for these and the coefficient of thermal expansion of the screen.

A second invention is a brazing method for a heat exchanger using a screen as described above, including: stacking a plurality of core plates—formed from an aluminum alloy brazing sheet containing Mg and formed in a shape having a taper portion at the periphery—on a base plate on the lower face side having a greater thickness than the core plates, being stacked such that the taper portions touch together; enclosing a stacked body of the core plates by mounting the screen onto the base plate such that it is conveyable together with the base plate; and brazing by sending the base plate still having the screen mounted thereto into a furnace together with the stacked body of core plates and heating under an inert gas atmosphere.

Using the screen according to the present invention enables brazing of a heat exchanger using an aluminum alloy brazing sheet to be performed without flux and without a vacuum furnace, and the various problems associated with flux and problems related to vacuum furnaces can be avoided.

Moreover, the screen is conveyed together with the workpiece while mounted on the base plate, which is a portion of the workpiece, and therefore there are no additional complicated processes or expensive equipment.

DETAILED DESCRIPTION

An embodiment of the present invention will be described in detail below.

Figure 1:
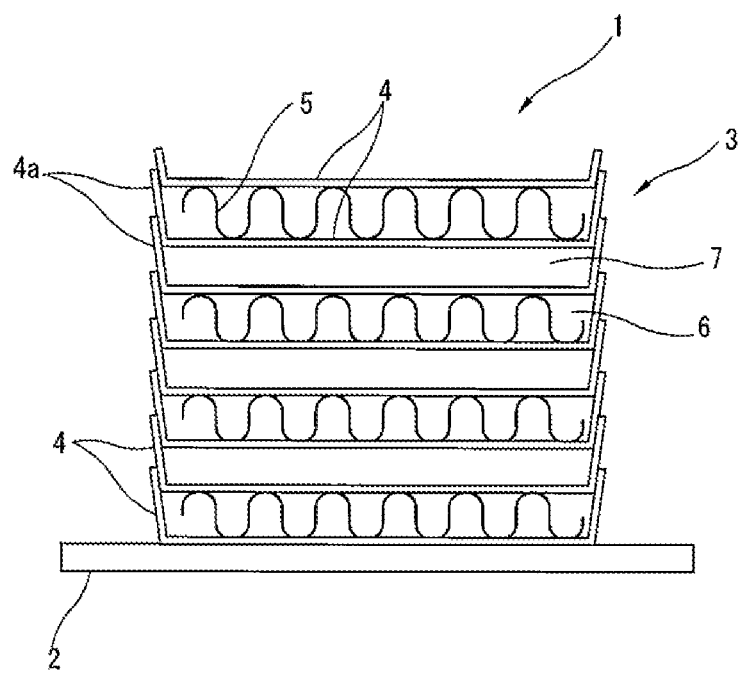
FIG. 1 shows a cross sectional descriptive view illustrating a configuration of a heat exchanger applicable to the present invention.

FIG. 1 is a cross sectional descriptive view schematically illustrating a configuration of a heat exchanger 1 of an embodiment applicable to the present invention. This heat exchanger 1 is, for example, an oil cooler for cooling lubricating oil for an internal combustion engine for a vehicle using heat exchange with a coolant. Note that in order to improve understanding, the terms "up" and "down" are used hereinafter and are based on the orientation in FIG. 1, which is the orientation at the time of brazing, but it is not limited to the orientation of FIG. 1 during use of an actual oil cooler.

The heat exchanger 1 is configured by mounting a stacked body, or in other words, a core portion 3, onto a base plate 2 shaped as a comparatively thick plate, the stacked body being composed by stacking a plurality of thin sheet core plates 4 together with fin plates 5.

Each constituent elements of the heat exchanger 1 (in other words, the core plates 4, fin plates 5, and base plate 2) are all constituted of an aluminum based material, and each part is integrally brazed together by heating inside a furnace while held by a jig after assembling each part in a predetermined state. As a technique for supplying the brazing material, the core plates 4 are formed by an aluminum alloy brazing sheet composed of a cladded material provided with a brazing material layer on both faces thereof. This brazing sheet contains a minute amount of Mg in order to achieve brazing without using flux. The brazing sheet will be described in further detail below.

The core portion 3 is configured such that a plurality of core plates 4 having a dish shape wherein the basic shape forms identical rectangles are stacked together with fin plates 5 to alternatingly configure a oil paths 6 and coolant paths 7 between two adjacent core plates 4. The fin plates 5 are disposed in the oil paths 6. Note that this type of heat exchanger 1 is a configuration that is substantially well known as disclosed in JP 2011-007411 A, JP 2013-007516, and the like.

The core plates 4 formed of a brazing sheet are configured having a taper portion 4a which stands up obliquely at the periphery, and when each core plate 4 is stacked in the vertical direction, each taper portion 4a mutually overlap and are tight together. Moreover, brazing together the taper portion 4a of each core plate 4 overlapping in this manner seals the perimeter of the oil paths 6 and coolant paths 7 in each level and the heat exchanger 1 is entirely integrated. Furthermore, the fin plates 5 are brazed to the surfaces of the core plates 4 inside the oil paths 6. Similarly, the bottom face of the bottom-most core plate 4 is brazed to the base plate 2.

The base plate 2 also functions as an installation part for installing the heat exchanger 1 at a desired location, and is configured to be larger than the core plates 4 so as to protrude to the perimeter from the core portion 3, and is a plate member thicker than the core plates 4.

Brazing is performed without using flux. Furthermore, brazing is performed without using a high vacuum vacuum-furnace as in conventional VB methods, and is performed at a pressure substantially near atmospheric pressure under an inert gas atmosphere such as nitrogen or argon. In other words, brazing is performed following the CAB method but without using flux. In one preferable example, brazing may be performed by using a continuous furnace for continuously performing a heating processing while conveying the workpiece.

Figure 2:
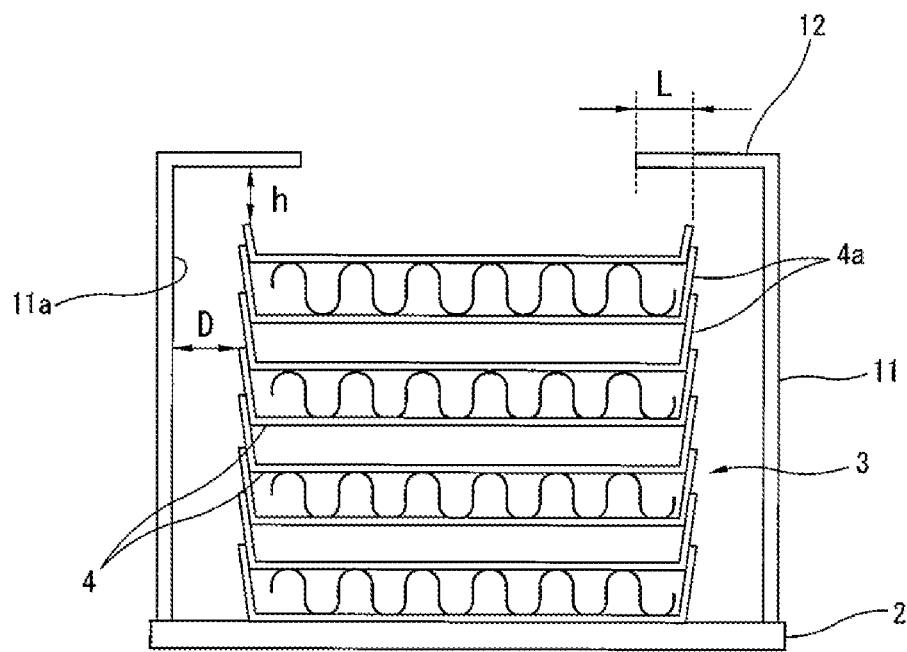
FIG. 2 shows a cross sectional descriptive view illustrating a state of a disposed screen.

When performing brazing in this manner, a screen 11 of the present invention schematically illustrated in FIG. 2 overlays the workpiece. Due to this screen 11, Mg vaporized from the brazing sheet does not disperse into the atmosphere but remains near the core portion 3 (that is, the stacked body of core plates 4), and this Mg captures oxygen and moisture near the brazing surface which hinder brazing properties.

The screen 11 is composed of a thin metal sheet of stainless steel or another heat resistant metal having just enough heat resistance to be able to withstand the heating temperature during brazing, and is formed as a tube having a substantially quadrilateral cross section and enclosing the core portion 3. Specifically, the inner wall face 11a of the tube portion is formed along the outer border of the core plates 4 such that there is a specific minute gap D between it and the tip edges of the taper portion 4a of the core plates 4. That is, there is a specific minute gap D throughout the entire perimeter. It is desirable for the minute gap D to be at least 0.5 mm and no more than 5 mm, and is particularly desirable to be no more than 2 mm.

Furthermore, in a preferable embodiment, a brim portion 12 covering the upper end of the minute gap D is provided on the upper end of the tube portion enclosing the core portion 3. It is desirable for the gap h between the topmost portion of the core portion 3 (for example, the topmost tip of the taper portion 4a), which the brim portion 12 opposes, and the lower face of the brim portion 12 to be no more than 5 mm.

When the brim portion 12 is viewed from above as a projection, it may overlap the periphery of the core portion 3. The overlapping margin L of the brim portion 12 and the core portion 3 periphery is at least 0 mm. In other words, when viewed from above as a projection, at least the brim portion 12 and the core portion 3 are disposed continuously with no interstice. The overlapping margin L may be a suitably large value as well, but it is necessary for the top face of the screen 11 to have a sufficiently large opening so as to allow displacement of gas between the internal space of the screen 11 and external space. The overlapping margin L is preferably 5 mm.

Note, each of the foregoing dimensions are values at room temperature.

Next, an example of the brazing sheet used for the core plate 4 of the heat exchanger 1 will be described. The brazing sheet of the embodiment has a brazing material layer provided on both faces of a core material, the brazing material layer having a lower melting point than the core material, and in particular, an intermediate layer is provided on the side facing the coolant path 7 between the core material and the brazing material layer to serve as a sacrificial layer to inhibit corrosion of the core material. In other words, it is a cladded material having a four layer structure.

It is desirable for the brazing material layer of the cladded material to be an Al—Si alloy containing at least 10.0 weight % and no more than 15.0 weight % of Si. As is well known, Si contributes to lowering the melting point.

Furthermore, it is desirable for at least any one layer among the brazing material layer, core material, and intermediate layer of the cladded material to contain Mg in the range of 0.25 to 1.5 weight %.

Moreover, it is desirable for at least any one layer among the brazing material layer, core material, and intermediate layer of the cladded material to contain Bi in the range of 0.02 to 0.5 weight %. Bi contributes to improving wettability of the surface during brazing.

Furthermore, it is desirable for at least any one layer among the brazing material layer, core material, and intermediate layer of the cladded material to contain an element having a higher vapor pressure at 577° C. than Mg. For example, it may contain at least 0.01 weight % of at least one among Zn, Na, K, and S as the element having a higher vapor pressure at 577° C. than Mg.

Table 1 shows the configuration of cladded materials A to I, which are the brazing sheets used in the testing of brazing properties described hereinafter.

| Cladded Material | Plate Thickness (mm) | Brazing Material Layer 1 Cladding Ratio: 6% | Intermediate Layer Cladding Ratio: 25% | Core Material Cladding Ratio: 63% | Brazing Material Layer 2 Cladding Ratio: 6% |
|---|---|---|---|---|---|
| A | 0.5 | Al + 12Si + 0.63Mg + 0.25Bi | Al + 1.5Zn | Al + 0.75Si + 0.2Cu + 1.5Mn | Same as Brazing Material Layer 1 |
| B | ↑ | Al + 10Si + 0.63Mg + 0.25Bi | ↑ | ↑ | ↑ |
| C | ↑ | Al + 7.5Si + 0.63Mg + 0.25Bi | ↑ | ↑ | ↑ |
| D | ↑ | Al + 12Si + 0.25Mg + 0.25Bi | ↑ | ↑ | ↑ |
| E | ↑ | Al + 12Si + 1.5Mg + 0.25Bi | ↑ | ↑ | ↑ |
| F | ↑ | Al + 12Si + 0.63Mg + 0.02Bi | ↑ | ↑ | ↑ |
| G | ↑ | Al + 12Si + 0.63Mg | ↑ | ↑ | ↑ |
| H | ↑ | Al + 12Si + 0.63Mg + 0.25Bi + 3Zn | ↑ | ↑ | ↑ |
| I | ↑ | Al + 12Si | Al + 1.5Zn + 0.75Mg + 0.25Bi | Al + 0.8Si + 1.2Mn + 0.75Mg + 0.25Bi | ↑ |

Next, testing of brazing properties performed using the cladded materials A to I described above and in conjunction with the use of the screen 11 will be described.

The cladded materials A to I shown in Table 1 were used to produce 80 mm square core plates 4 via stamp forming. The base plate 2 and fin plates 5 were produced using AA3003 material.

The alkali cleaning or acid cleaning shown in Table 2 was performed on the stamp formed core plates 4, and thereafter, they were ultrasonically cleaned using pure water.

| Chemical Cleaning | Chemical Components | Time | Temperature | Post-Processing |
|---|---|---|---|---|
| Acid Cleaning | HF1% + HNO³ 2% aqueous solution | 90 Seconds | Room Temperature | Ultrasonically cleaned in pure water 1 minute × 2 times |
| Alkali Cleaning | NaOH 6% aqueous solution | 60 Seconds | Room Temperature | ↑ |

Thereafter, the core plates 4 and the fin plates 5 were stacked on the base plate 2 as illustrated in FIG. 1 to assemble the heat exchanger 1 and were fixed by a jig, and moreover, the screen 11 was provided as illustrated in FIG. 2.

The screen 11 used in the test was made of SUS304 and had a plate thickness of 1 mm.

The heat exchanger 1 having the screen 11 placed on the base plate 2 was brazed without flux using a CAB method under the conditions described below.

A mesh belt continuous aluminum brazing furnace was used as the brazing furnace, and nitrogen was used as the inert gas.

Brazing was performed under conditions wherein oxygen concentration was 15 to 20 ppm and the dew point was −55° C. to −57° C. in a brazing furnace temperature zone of 450° C. to 600° C.

Temperature conditions were as follows: the temperature of the workpiece was measured, and temperature control was performed to raise the temperature from room temperature to 600° C. in 30 minutes, hold it at 600° C. for three minutes, and thereafter cool it from 600° C. to 450° C. in 4 minutes.

An airtightness test and confirmation of the brazing state was performed for the brazed product. The brazing state was an evaluation of the fillet formation length of the outer face side of the brazed portion. That is, the fillet formation rate was found as "fillet formation rate=length of formed fillet/total length to be brazed"; 95% and below was evaluated as "x", 95 to 99% as "A", 99 to 100% as "o", and 100% as "⊚".

The airtightness test was to perform an air leak test at 0.5 MPa for one minute and check for airtightness in water.

The test results are shown in Table 3.

| | Material | Chemical Cleaning | Screen D | Screen h | Screen L | Air-tightness | Periphery Fillet Formation |
|---|---|---|---|---|---|---|---|
| Example 1 | A | Alkali | 1 | 1 | 5 | ○ | ⊚ |
| Example 2 | A | Alkali | 2 | 1 | 5 | ○ | ⊚ |

-continued

| | Material | Chemical Cleaning | Screen D | Screen h | Screen L | Air-tightness | Periphery Fillet Formation |
|---|---|---|---|---|---|---|---|
| Example 3 | A | Alkali | 5 | 1 | 5 | ○ | ○ |
| Example 4 | A | Alkali | 1 | 1 | 1 | ○ | ○ |
| Example 5 | A | Alkali | 1 | 5 | 5 | ○ | ⊚ |
| Example 6 | B | Alkali | 1 | 1 | 5 | ○ | ○ |
| Example 7 | D | Alkali | 1 | 1 | 5 | ○ | Δ |
| Example 8 | E | Alkali | 1 | 1 | 5 | ○ | Δ |
| Example 9 | F | Alkali | 1 | 1 | 5 | ○ | Δ |
| Example 10 | H | Alkali | 1 | 1 | 5 | ○ | ⊚ |
| Example 11 | I | Alkali | 1 | 1 | 5 | ○ | ⊚ |
| Example 12 | A | None | 1 | 1 | 5 | ○ | Δ |
| Example 13 | A | Acid | 1 | 1 | 5 | ○ | ○ |
| Comparative Example 1 | A | Alkali | No Screen | ← | ← | X | X |
| Comparative Example 2 | A | Alkali | 10 | 1 | 5 | ○ | X |
| Comparative Example 3 | A | Alkali | 1 | No Brim | ← | ○ | X |
| Comparative Example 4 | A | Alkali | 1 | 10 | 5 | ○ | X |

-continued

| Mate-rial | Chemical Cleaning | Screen D | h | L | Air-tight-ness | Periphery Fillet Formation |
|---|---|---|---|---|---|---|
| Comparative Example 5 | C Alkali | 1 | 1 | 5 | ○ | X |
| Comparative Example 6 | G Alkali | 1 | 1 | 5 | X | X |

According to the comparison between example 1 and comparative example 1 in Table 3, it is clear as a result of these tests that even when a material and chemical cleaning thought to be optimal were selected, when the screen 11 is not used and disposition is not optimal, it was difficult to braze using a CAB method without using flux, and it is therefore necessary to provide the screen 11.

Furthermore, even when the screen 11 is used, it is necessary to appropriately manage the shape of the screen 11 and its positional relationship to the product. As is clear in light of the comparison between examples 1, 2, and 3 and comparative example 2, in order to achieve satisfactory brazing properties, it is desirable for the distance D between the screen 11 and the brazed portion of the product outer face (in other words, the taper portion 4a tip edge) to be 5 mm or less.

Furthermore, as is clear in light of the comparison between example 1 and comparative example 3, providing a brim portion 12 on the screen 11 contributes to brazing stability.

In addition, according to the comparison between example 1 and comparative example 4, it is desirable for the distance h of the opening formed by the brim portion 12 of the screen 11 and the topmost portion of the product to be no more than 5 mm in order to improve airtightness and the fillet formation rate.

Meanwhile, according to the comparison between examples 1 and 5 and comparative example 5, even when the screen 11 is optimally set, if the Si concentration of the brazing material layer of the cladded material is less than 10 weight %, airtightness can be ensured but the fillet formation rate worsens, and therefore, it can be said that it is desirable for the Si in the brazing material layer to be at least 10 weight %.

Moreover, according to examples 1, 7, and 8, it can be confirmed that when the screen 11 is optimally set, if the Mg concentration of the brazing material layer of the cladded material is at least 0.25 weight % and no more than 1.5 weight %, airtightness and the fillet formation rate are both satisfied.

The lower limit for Mg required for the breakdown of the oxidized aluminum film on the surface during brazing is 0.25 weight %, but on the other hand, when Mg exceeds 1.5 weight %, a rigid oxidized magnesium film is produced instead, and this is thought to inhibit brazing properties.

Furthermore, according to the comparison between examples 1 and 9 and comparative example 6, it is clear that even when the screen 11 is optimally set, it is desirable for traces of Bi to be present in the brazing material layer of the cladded material, and it can be confirmed that if Bi is at least 0.02 weight % weight or more, airtightness and the fillet formation rate are satisfied. It is thought that this is due to the trace amounts of Bi improving the flowability of the molten brazing material.

Note that Bi easily diffuses during brazing due to the heat, and therefore it is presumed that, in addition to adding it directly to the brazing material, it can diffuse into the brazing material from the heat during brazing by adding it to at least one layer among the core or the intermediate layer, and therefore Bi may be added to at least one layer among the brazing material, the core, and the intermediate layer.

According to the comparison between example 3 and comparative example 10, it can be confirmed that adding Zn as a highly volatile element into the brazing material of the cladded material further improves brazing properties.

In light of the comparison between examples 1, 12, and 13, respectively optimizing the screen 11 and the cladded material can ensure the brazing properties even without chemical cleaning, but performing chemical cleaning reduces surface oxide film, and in addition, it can be confirmed that brazing inhibitory substances and the like can be removed, and therefore the fillet formation rate is further improved.

According to example 11, it can be confirmed that, due to the size of their diffusion coefficient, Mg and Bi have an effect not just when added to the brazing material, but also when added to either the core or the intermediate layer adjacent to the brazing material.

Note that in terms of the efficiency of the transfer of radiant heat from the furnace during brazing, it is better to have a larger heat receiving surface area on the top face of the core portion 3, and therefore, it is preferable to set the overlapping margin L of the brim portion 12 such that the heat receiving surface area is at least 70% of the top face surface area. When the overlapping margin L is 5 mm, if, for example, the external dimensions of the core plate 4 is 80 mm×80 mm, the heat receiving surface area can be ensured to be at least 70%.

Next, more specific configurations of the screen 11 will be described based on FIG. 3 to FIG. 12.

Figure 3:
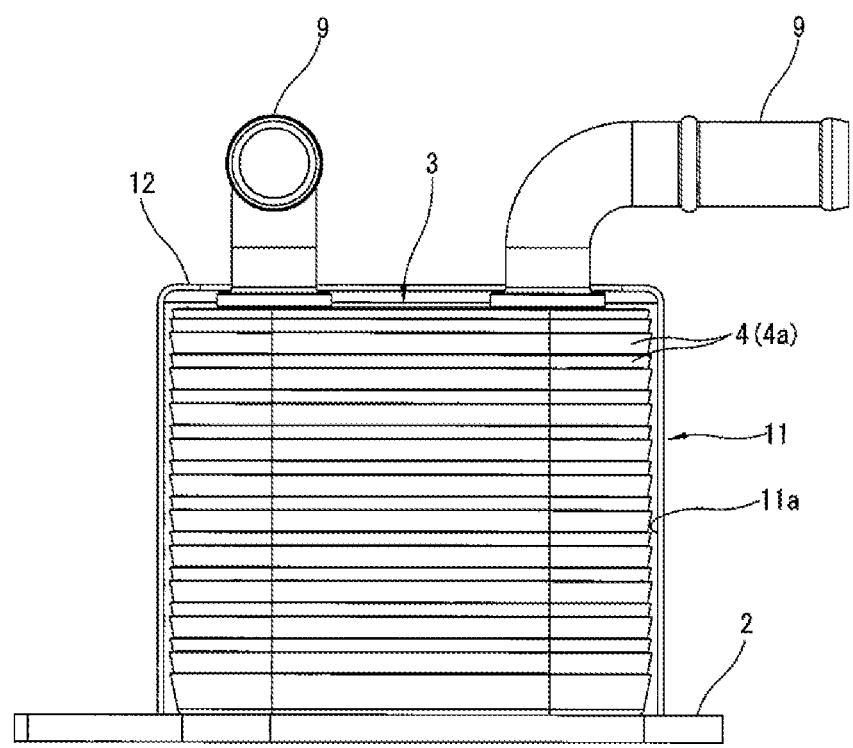
FIG. 3 shows a cross sectional view illustrating a screen of a first embodiment together with the heat exchanger.
Figure 4:
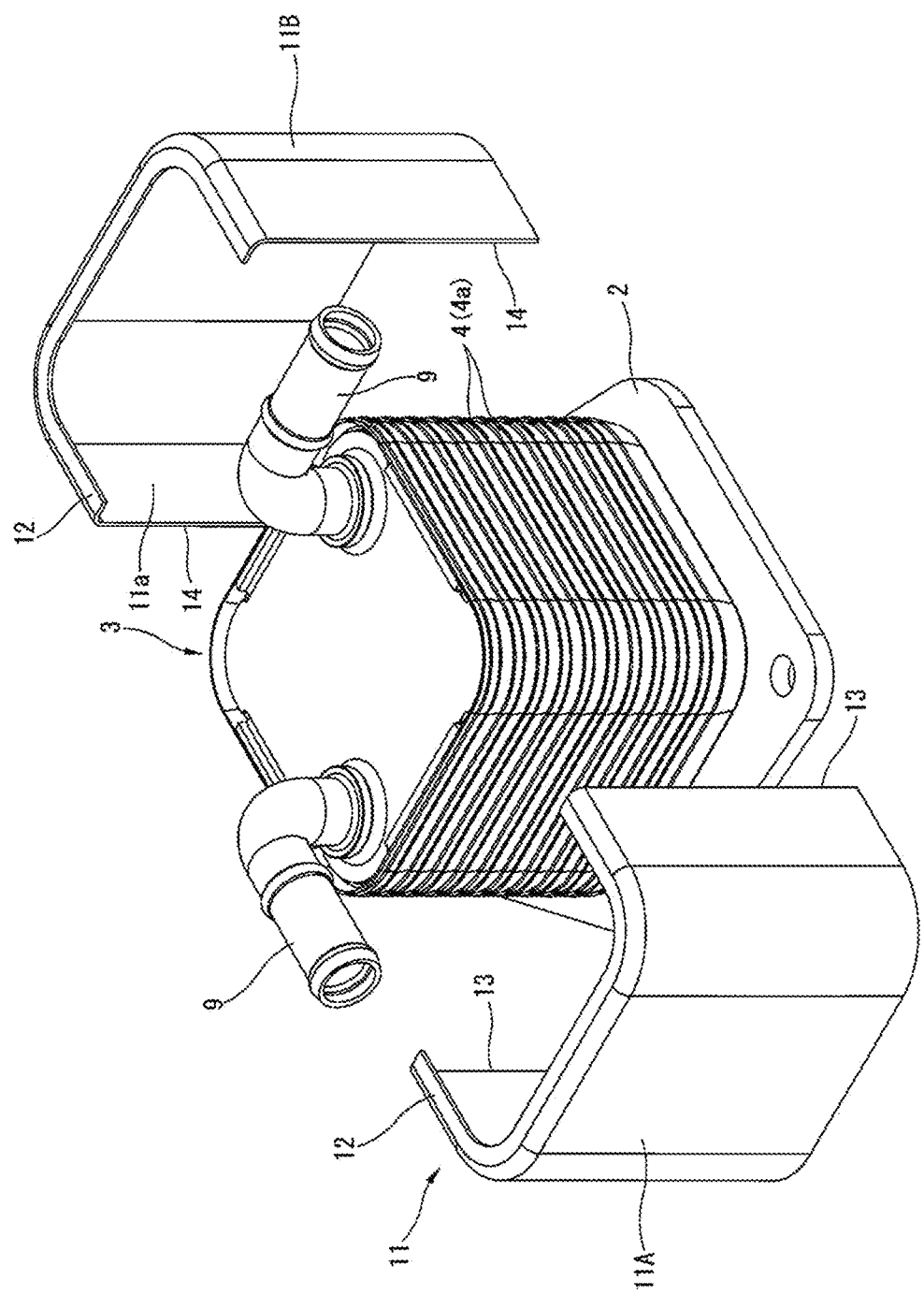
FIG. 4 shows a perspective view illustrating a state of the screen before assembly.
Figure 5:
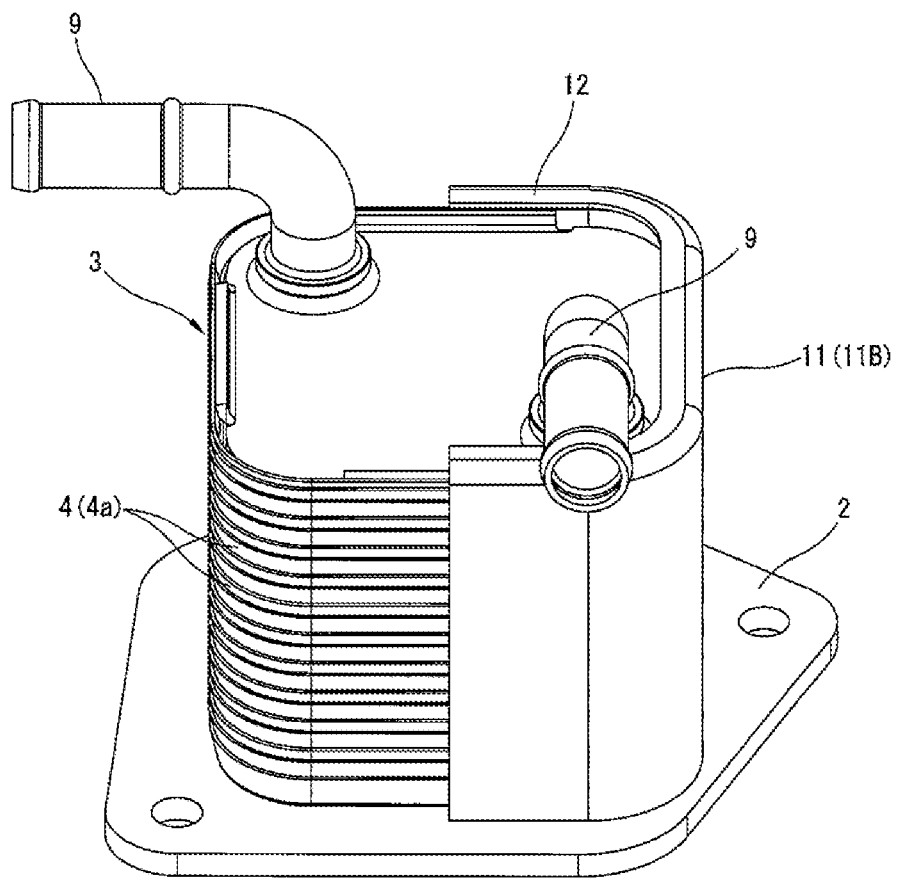
FIG. 5 shows a perspective view illustrating only one half portion together with the heat exchanger.

FIG. 3 to FIG. 5 illustrate a first example of the screen 11. This screen 11 is configured by bending a stainless steel thin plate (for example, a thickness of approximately 1 mm) such as, for example, SUS304 which is heat resistant, and the screen 11 is formed as a tube having a substantially square cross section and enclosing the core portion 3 of the heat exchanger 1. In particular, the inner wall face 11a forms a shape along the border of the core plates 4, the corners of which are rounded, such that there is a specific minute gap spanning the entire perimeter between the inner wall face 11a and the tip edges of the taper portion 4a of the core plates 4. The brim portion 12 curved toward the inner side of the perimeter is provided on the top end of the tube portion such that the top end of the minute gap created between the inner wall face 11a and the core portion 3 is covered. Note, the screen 11 may be formed from other metal materials. As mentioned above, it is desirable for the metal material to have a coefficient of thermal expansion of at least 11×10-6 and a melting point of at least 650° C.

Furthermore, in the first example, the screen 11 is configured to be separated into two components, a first half portion 11A and a second half portion 11B, so as to sandwich, from both sides, the core portion 3 above the base plate 2. In the first example, the center of the two opposing side faces are the separated faces of the first half portion 11A and the second half portion 11B. This first half portion 11A and second half portion 11B are disposed such that each edge 13 and 14 on the separated faces are opposing each other.

FIG. 5 illustrates a state wherein only one half, the second half portion 11B, is mounted onto the base plate 2; however, as illustrated in FIG. 5, the screen 11 is mounted onto the base plate 2 before the brazing process and conveyed together with the base plate 2. That is, it is sent into and out of the furnace while mounted onto the base plate 2. A workpiece fixed in an assembled state (that is, a heat exchanger 1), using a jig (not illustrated), is heated and integrally brazed under inert gas inside a furnace while in a state of being enclosed by the screen 11. Moreover, the brazing process is completed and the temperature is sufficiently decreased, and thereafter, the screen 11 is taken off of the workpiece. The screen 11 can, obviously, be reused.

Note, in the illustrated example of the heat exchanger 1, two connectors 9 protrude from the upper portion, and these connectors 9 are in a position wherein they do not interfere with the brim portion 12 of the screen 11.

Figure 6:
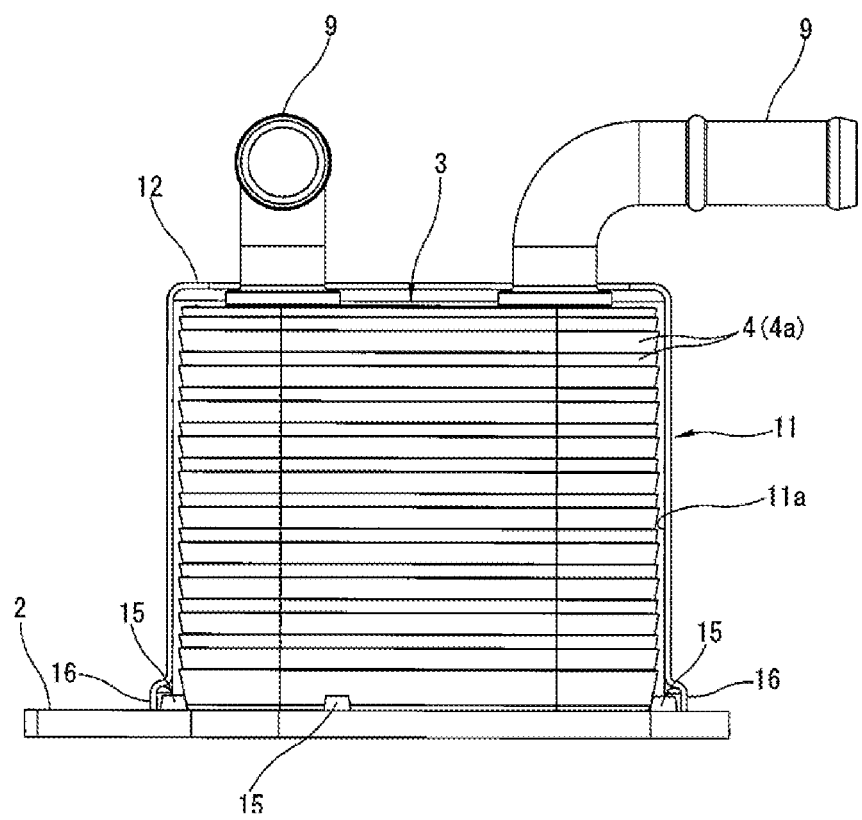
FIG. 6 shows a cross sectional view illustrating a screen of a second embodiment together with the heat exchanger.

FIG. 6 illustrates a second example of the screen 11. In this second example, a plurality of locating pins 15 for locating the lowest core plate 4 in the core portion 3 is provided on the base plate 2 of the heat exchanger 1, which is the workpiece. That is, the lowest core plate 4 is set within an area enclosed by the plurality of locating pins 15. Moreover, the screen 11 is located above the base plate 2 using this plurality of locating pins 15. That is, the screen 11, which is separated in two, is set on the outer side of the plurality of locating pins 15. A swelled portion 16, which fits each locating pin 15, is formed on the bottom edge portion of the screen 11.

Accordingly, the screen 11 is located above the base plate 2 using the locating pins 15, whereby managing the position of the screen 11 with respect to the core portion 3 becomes simple, and as a result brazing can be performed reliably.

Note, the screen 11 may be located by forming a groove in the base plate 2 as an engaging portion instead of the locating pins 15, the groove being formed along the shape of the outer circumference of the bottom end portion of the screen 11, and causing the bottom end of the screen 11 to engage with this groove.

Figure 7:
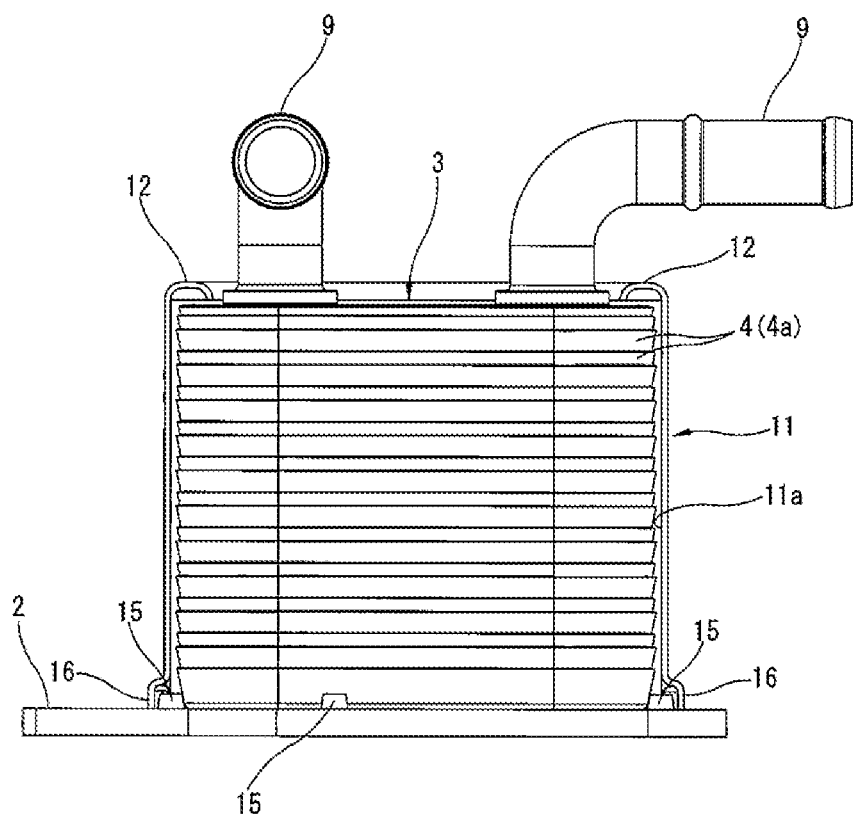
FIG. 7 shows a cross sectional view illustrating a screen of a third embodiment together with the heat exchanger.

FIG. 7 illustrates a third example of the screen 11. In this third example, the brim portion 12 is formed not in a shape following a simple flat face, but in a shape in which the inner perimeter end of the brim portion 12 is curved downward. In other words, the brim portion 12 has a convex cross sectional shape facing upwards.

Figure 8:
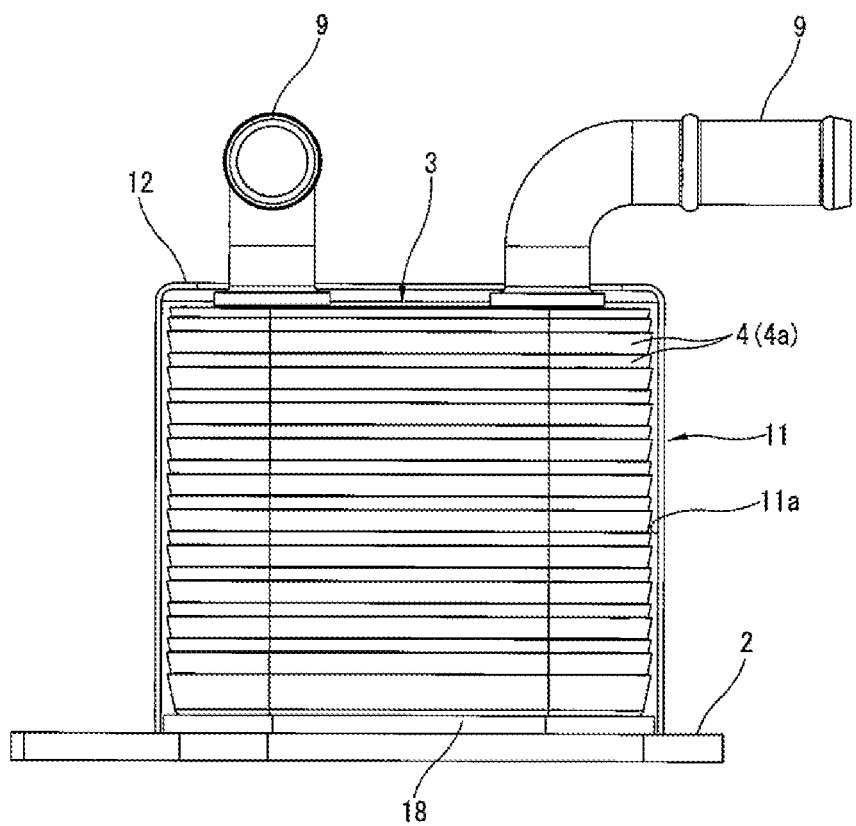
FIG. 8 shows a cross sectional view illustrating a screen of a fourth embodiment together with the heat exchanger.
Figure 9:
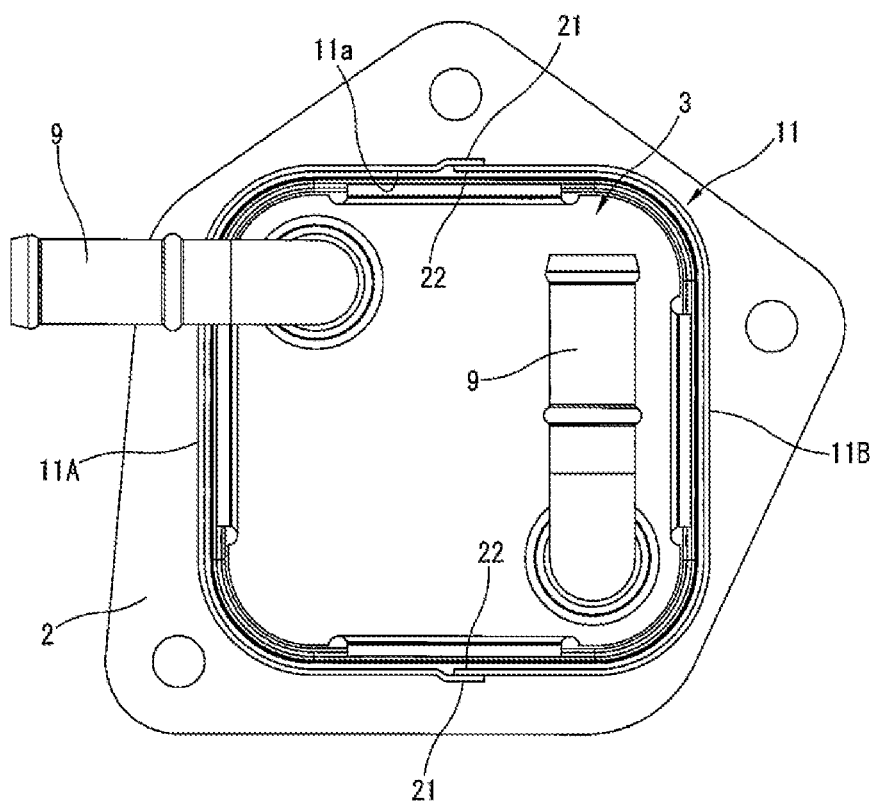
FIG. 9 shows a plan view illustrating a screen of a fifth embodiment together with the heat exchanger.
Figure 10:
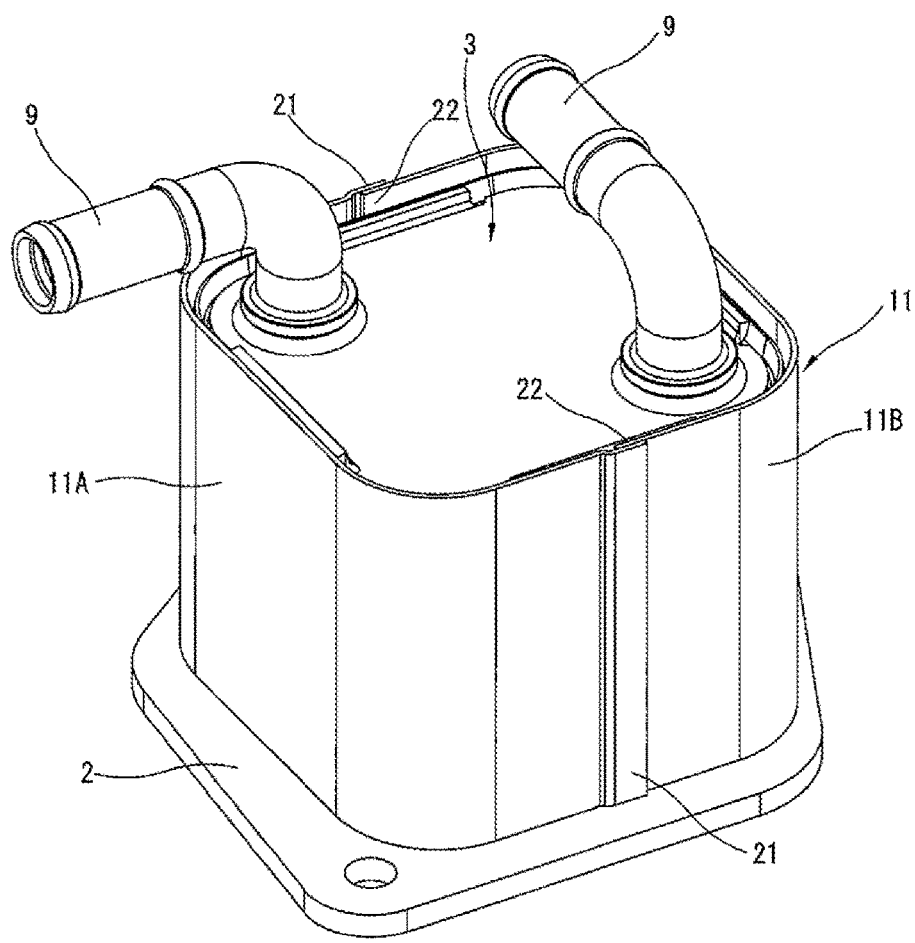
FIG. 10 shows a descriptive view illustrating the screen of the fifth embodiment together with the heat exchanger.

FIG. 8 illustrates a fourth example of the screen 11. In this fourth example, a second base plate 18 smaller than the base plate 2 is superimposed on the base plate 2, and the screen 11 is located using the periphery of this second base plate 18. That is, the outer shape of the second base plate 18 corresponds to the desired position of the screen 11 and to the border of the inner wall face 11a of the screen 11 in this position, and the position of the screen 11 on the base plate 2 is controlled by fitting the screen 11 over the periphery of the second base plate 18. FIG. 9 and FIG. 10 illustrate a fifth example of the screen 11 wherein the configuration of the boundary between the first half portion 11A and the second half portion 11B is modified. In this fifth example, the edge portion 21 of the first half portion 11A extends, being offset to the outside only by the plate thickness, and overlaps together with the edge portion 22 of the second half portion 11B positioned on the inside. Accordingly, the generation of an interstice between the first half portion 11A and the second half portion 11B (that is, a channel out of which vaporized Mg and the like would flow) is inhibited, while the inner wall face 11a is a continuous face substantially without unevenness. That is, while each edge portion 21 and 22 are superimposed upon one another, a fixed minute gap along the entire perimeter between the core portion 3 can be obtained.

Note, the brim portion 12 is not illustrated in FIG. 9 and FIG. 10, but a brim portion 12 similar to that of the first example or the third example may be provided.

Figure 11:
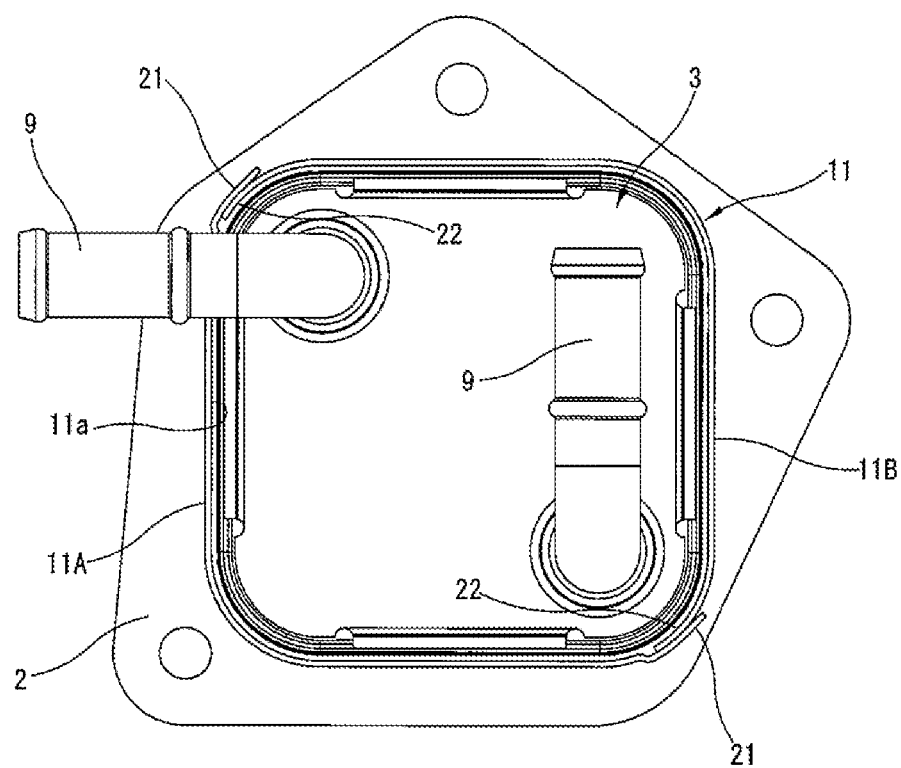
FIG. 11 shows a plan view illustrating a screen of a sixth embodiment together with the heat exchanger.
Figure 12:
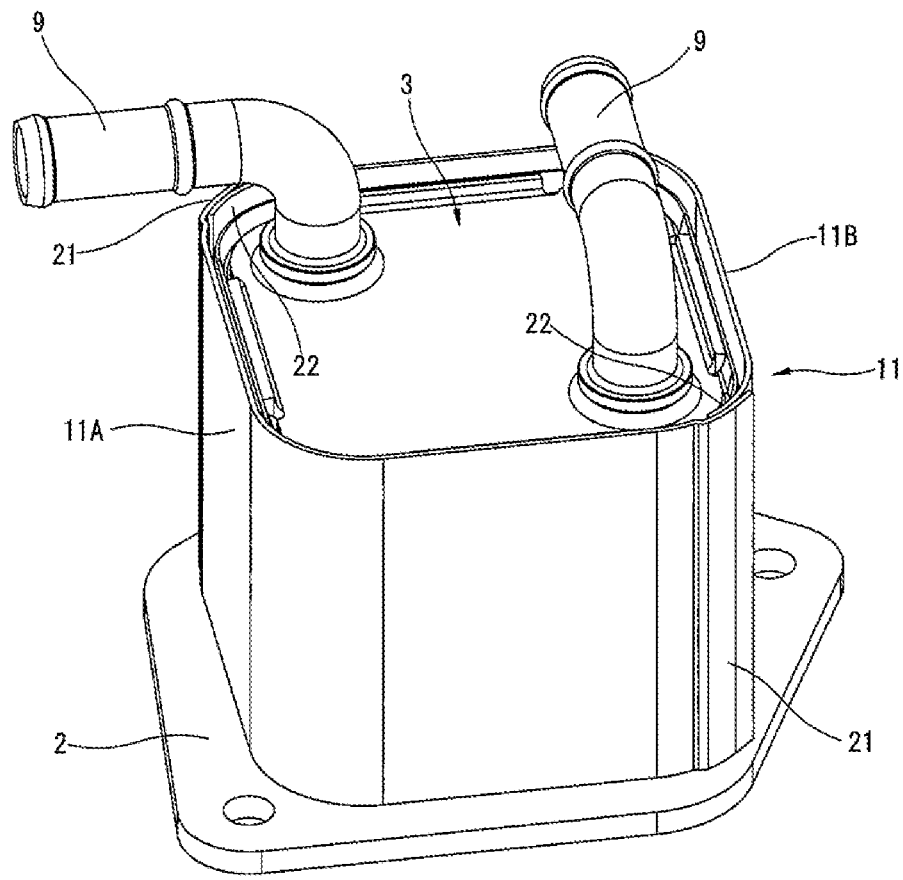
FIG. 12 shows a descriptive view illustrating the screen of the sixth embodiment together with the heat exchanger.

FIG. 11 and FIG. 12 illustrate a sixth example of the screen 11 in which the position of the boundary in the fifth example is modified. In this sixth example, the boundaries between the first half portion 11A and the second half portion 11B are positioned at the mutually opposing corner portions of the substantially square-shaped tube portion. Moreover, similar to the fifth example, the edge portion 21 of the first half portion 11A extends, being offset to the outside only by the plate thickness, and overlaps together with the edge portion 22 of the second half portion 11B positioned on the inside. Accordingly, similar to the fifth example, the generation of an interstice between the first half portion 11A and the second half portion 11B is inhibited, and the inner wall face 11a is a continuous face substantially without unevenness. That is, while each edge portion 21 and 22 are superimposed upon one another, a fixed minute gap along the entire perimeter between the core portion 3 can be obtained.

Note, the brim portion 12 is not illustrated in FIG. 11 and FIG. 12. but a brim portion 12 similar to that of the first example or the third example may be provided.

Additionally, the screen 11 is not limited to a configuration having two separations as described above, but may be configured to be separated into an arbitrary quantity such as three separations or four separations.

The invention claimed is:

1. A screen for brazing a heat exchanger including a plurality of core plates formed from an aluminum alloy brazing sheet containing magnesium (Mg), the plurality of core plates formed in a shape having a taper portion at a periphery, a base plate disposed on a lower face side of the plurality of core plates, the base plate being larger and thicker than a core plate of the plurality of core plates, the plurality of core plates and the base plate heated and brazed under an inert gas atmosphere, the screen comprising:
    a metal tube enclosing a stacked body of the plurality of core plates, the tube following an outer border of the plurality of core plates such that a specific minute gap is defined between an inner wall face of the tube and a tip edge of the taper portion;
    the tube mounted onto the base plate; and
    wherein the taper portion of the plurality of core plates are stacked such that the taper portions touch together.

2. The screen according to claim 1, wherein the taper portion of each of the plurality of core plates projects obliquely from the periphery, and when each core plate of the plurality of core plates is stacked in a vertical direction, the taper portions of the plurality of core plates mutually overlap and are tight together.

3. The screen according to claim 1, wherein:
    a bottom end of the tube is configured to engage an engaging portion of the base plate; and
    the tube is positionable on the base plate via engaging the engaging portion of the base plate and the bottom end of the tube.

4. The screen according to claim 1, wherein the base plate includes a plurality of locating pins structured and arranged to locate the tube on the base plate and to locate the stacked body of the plurality of core plates on the base plate.

5. The screen according to claim 1, further comprising a second base plate, wherein:
    the second base plate is smaller than the first base plate and is superimposed on the first base plate; and the tube is positionable on the base plate via engaging the tube and a periphery of the second base plate.

6. The screen according to claim 1, wherein the minute gap is 0.5 mm to 5 mm.

7. The screen according to claim 1, wherein the tube includes a brim portion arranged at a top end of the tube, the brim portion covering a top end of the minute gap.

8. The screen according to claim 1, wherein:
the tube includes a plurality of separate pieces; and
the plurality of separate pieces enclose, from a perimeter, the stacked body of the plurality of core plates assembled on the base plate.

9. The screen according to claim 8, wherein:
the plurality of separate pieces includes a first half portion and a second half portion; and
the first half portion and the second half portion sandwich, from both sides, the stacked body of the plurality of core plates assembled on the base plate.

10. The screen according to claim 9, wherein:
the first half portion includes an edge portion that is offset to an outside only by a thickness of the second half portion; and
at a boundary between the first half portion and the second half portion, the edge portion of the first half portion overlaps an edge portion of the second half portion such that the edge portion of the second half portion is positioned on an inside of the edge portion of the first half portion.

11. The screen according to claim 1, wherein the tube is composed of a metal material having a coefficient of thermal expansion of at least $11 \times 10^{-6}$ and a melting point of at least 650° C.

12. A brazing method for a heat exchanger, comprising:
stacking a plurality of core plates, which are formed from an aluminum alloy brazing sheet containing magnesium (Mg) and formed in a shape having a taper portion at the periphery, on a base plate having a greater thickness than the plurality of core plates, the plurality of core plates stacked such that the taper portions touch together and a lower face side of the plurality of core plates is disposed on the base plate;
enclosing a stacked body of the plurality of core plates via mounting a screen onto the base plate such that the screen is conveyable together with the base plate;
brazing the plurality of core plates to one another and to the base plate via sending the base plate with the screen mounted thereto into a furnace together with the stacked body of the plurality of core plates and heating under an inert gas atmosphere; and
wherein mounting the screen onto the base plate includes arranging the screen spaced apart from an outer border of the plurality of core plates such that a minute gap is defined between an inner wall face of the screen and a tip edge of the taper portion.

13. A heat exchanger, comprising:
a plurality of core plates stacked on one another to define a stacked body, the plurality of core plates each formed from an aluminum alloy brazing sheet containing magnesium (Mg);
a base plate having a width that is larger than a width of a core plate of the plurality of core plates, the base plate disposed on a lower face side of the plurality of core plates; and
a screen configured as a metal tube and mounted onto the base plate, the screen enclosing the stacked body;
the plurality of core plates each having a periphery and a taper portion disposed at the periphery, the plurality of core plates stacked such that the taper portions touch together;
the stacked body arranged on an upper face of the base plate;
wherein the screen is arranged on the base plate spaced apart from the stacked body and extends around an outer border of the stacked body such that a specific minute gap is defined between an inner wall face of the tube and a tip edge of the taper portion; and
wherein the plurality of core plates and the base plate are heated and brazed under an inert gas atmosphere.

14. The heat exchanger of claim 13, wherein:
the taper portion of at least one core plate of the plurality of core plates projects vertically from the periphery of the at least one core plate;
the plurality of core plates are stacked in a vertical direction; and
the taper portion of each of the plurality of core plates overlaps the taper portion of an adjacent core plate of the plurality of core plates.

15. The heat exchanger of claim 13, wherein the screen includes a first half portion and a second half portion that engage one another to define the screen.

16. The heat exchanger of claim 15, wherein:
the first half portion includes a first edge portion;
the second half portion includes a second edge portion; and
the first edge portion protrudes outwardly from the first half portion and overlaps the second edge portion.

17. The heat exchanger of claim 13, wherein the base plate includes an engaging portion configured to engage a bottom end of the screen to position the screen on the base plate.

18. The heat exchanger of claim 13, wherein the base plate includes a plurality of locating pins configured to position the stacked body on the top surface of the base plate.

19. The heat exchanger of claim 13, further comprising a second base plate, wherein:
the second base plate is smaller than the base plate;
the second base plate is superimposed on the top surface of the base plate; and
the screen extends around an edge of the second base plate.

20. The method of claim 12, wherein mounting the screen onto the base plate includes positioning the screen on the base plate via engaging a bottom end of the screen and an engaging portion of the base plate.

* * * * *